United States Patent
Lee et al.

(10) Patent No.: US 11,223,648 B2
(45) Date of Patent: Jan. 11, 2022

(54) SYSTEMS AND METHODS FOR AUTOMATICALLY SELECTING AN ACCESS CONTROL ENTITY TO MITIGATE ATTACK TRAFFIC

(71) Applicant: Akamai Technologies, Inc., Cambridge, MA (US)

(72) Inventors: Bonita G. Lee, Plantation, FL (US); Christopher Bero, Boynton Beach, FL (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 16/855,056

(22) Filed: Apr. 22, 2020

(65) Prior Publication Data

US 2020/0389485 A1 Dec. 10, 2020

Related U.S. Application Data

(63) Continuation of application No. 15/608,568, filed on May 30, 2017, now Pat. No. 10,673,891, which is a (Continued)

(51) Int. Cl.
*H04L 29/06* (2006.01)
*H04L 12/26* (2006.01)

(52) U.S. Cl.
CPC ........ *H04L 63/1441* (2013.01); *H04L 43/067* (2013.01); *H04L 63/00* (2013.01);
(Continued)

(58) Field of Classification Search
CPC ..... H04L 63/00; H04L 63/02; H04L 63/0227; H04L 63/0236; H04L 63/10; H04L 63/101; H04L 63/14; H04L 63/1408; H04L 63/1416; H04L 63/1425; H04L 63/1441; H04L 63/1458; H04L 63/1483; H04L 63/20; H04L 43/04; H04L 43/06;
(Continued)

(56) References Cited

U.S. PATENT DOCUMENTS 6,651,096 B1 * 11/2003 Gai ..................... H04L 63/0263
709/223
7,254,713 B2 8/2007 D'Souza
(Continued)

OTHER PUBLICATIONS

Communication Under MPEP § 609.02, filed Apr. 22 2020 in this case, 2 pages.
(Continued)

*Primary Examiner* — Theodore C Parsons

(57) ABSTRACT

The methods and system described herein automatically generate network router access control entities (ACEs) that are used to filter internet traffic and more specifically to block malicious traffic. The rules are generated by an ACE engine that processes incoming internet packets and examines existing ACEs and a statistical profile of the captured packets to produce one or more recommended ACEs with a quantified measure of confidence. Preferably, a recommended ACE is identified in real time of the attack, and preferably selected from a library of pre-authored ACEs. It is then deployed automatically or alternatively sent to system personnel for review and confirmation.

8 Claims, 9 Drawing Sheets

Related U.S. Application Data continuation of application No. 15/608,542, filed on May 30, 2017, now Pat. No. 10,673,890.

(52) U.S. Cl.
CPC ...... *H04L 63/0227* (2013.01); *H04L 63/0236* (2013.01); *H04L 63/101* (2013.01); *H04L 63/1408* (2013.01); *H04L 63/1416* (2013.01); *H04L 63/1425* (2013.01); *H04L 63/20* (2013.01)

(58) Field of Classification Search
CPC ..... H04L 43/062; H04L 43/067; H04L 43/08; H04L 43/0805; H04L 43/0811; H04L 43/0852; H04L 43/0876; H04L 43/10
See application file for complete search history.

(56) References Cited

U.S. PATENT DOCUMENTS

| | | |
|---|---|---|
| 7,380,010 B1 | 5/2008 | Oran |
| 8,346,960 B2 | 1/2013 | Van et al. |
| 8,510,826 B1 | 8/2013 | Reams, III et al. |
| 8,566,936 B2 | 10/2013 | Chesla |
| 8,892,766 B1 | 11/2014 | Wei et al. |
| 10,673,890 B2 | 6/2020 | Lee et al. |
| 10,673,891 B2 | 6/2020 | Lee et al. |
| 2007/0157306 A1* | 7/2007 | Elrod .................. H04L 63/1416 726/14 |
| 2010/0192201 A1* | 7/2010 | Shimoni ............. H04L 63/1458 726/3 |
| 2015/0007314 A1* | 1/2015 | Vaughan ............. H04L 63/1425 726/23 |
| 2016/0021056 A1* | 1/2016 | Chesla ................... H04L 63/14 726/11 |
| 2016/0359915 A1* | 12/2016 | Gupta ..................... H04L 63/20 |
| 2017/0279839 A1* | 9/2017 | Vasseur ............... H04L 63/1416 |
| 2018/0351992 A1 | 12/2018 | Lee et al. |
| 2018/0351993 A1 | 12/2018 | Lee et al. |
| 2019/0014153 A1* | 1/2019 | Lang ..................... G06F 21/604 |

OTHER PUBLICATIONS

U.S. Appl. No. 15/608,568, parent case, filed May 30, 2017.
U.S. Appl. No. 15/608,542, parent case, filed May 30, 2017.

* cited by examiner

SYSTEMS AND METHODS FOR AUTOMATICALLY SELECTING AN ACCESS CONTROL ENTITY TO MITIGATE ATTACK TRAFFIC

This application is a continuation of and claims the benefit of priority of U.S. application Ser. No. 15/608,568, filed May 30, 2017, which is a continuation of and claims the benefit of priority of U.S. application Ser. No. 15/608,542, filed May 30, 2017, the teachings of which are hereby incorporated by reference.

BACKGROUND

Technical Field

This application relates generally to mitigating computer network attacks and more particularly to the automated selection of an appropriate access control entity to install in a router, firewall or similar device to mitigate the attack.

Brief Description of the Related Art

It is known in the art to detect and mitigate cyber-attacks by identifying malicious network traffic and installing an appropriate access control list to block attacks from reaching protected infrastructure. One notable kind of attack is a volumetric attack, also referred to as a denial of service (DoS) attack; however, many kinds of attacks exist and they are continually evolving.

An access control entity (ACE) is a rule that describes parameters of traffic such that the traffic can be denied or exclusively permitted. An access control list (ACL) is a set of one or more ACE rules used to filter network traffic. Typically it describes the parameters of traffic that should be denied. An ACL is sometimes referred to as a blacklist. As an ACL is a logical grouping of ACE rules, the ACL can be associated with a particular type of attack, or a particular type of traffic or content, or a particular type of application (e.g., that is being protected).

ACE rules are typically installed in a network protection device such as a router, firewall, intrusion prevention device, or the like. Often, device manufacturers use different rule structures and syntax for ACEs. In other words, different manufacturers may have different ways of expressing a logical test that defines traffic to be blocked. Once an ACE rule is installed, typically the implicated traffic is blocked on a packet by packet basis. That is, ACE rules are applied to each packet, resulting in a determination of whether to block the packet or allow it through.

In some cases, ACEs may be installed in routers, firewalls, or other devices and integrated into a dedicated infrastructure designed to analyze and if necessary block traffic on a large scale. These are sometimes referred to as a network "data cleaning center" or equivalently a "scrubbing center". A description of a data cleaning center and associated technologies for attack mitigation can be found in U.S. Pat. No. 7,478,429, issued Jan. 13, 2009, owned by the assignee hereof, and which is hereby incorporated by reference in its entirety and for all purposes. As mentioned in that patent, a data cleaning center may have an associated security operations center (SOC), staffed 24×7 by highly-skilled professionals who monitor traffic for threats and who author and deploy appropriate ACEs on a near real-time basis. Speed and accuracy are paramount when developing ACEs. A service provider entity may operate the data cleaning center (and/or a platform of many such centers) as a multi-tenant platform to provide a network security service offering. This may be thought of as an IaaS (Infrastructure-as-a-Service). Customers may include website and enterprise network owners who desire to have their resources protected by the service provider. Each customer can be associated with a particular set of one or more ACEs (i.e., an ACL) designed to be applied to that customer's inbound traffic.

As noted above, currently ACEs are created manually by SOC personnel who evaluate the attack versus clean traffic and then compose ACEs, typically with five or more parameters. There is an inherent delay in manually creating an ACE. Furthermore, such an approach may result in an ACE that is under-inclusive or over-inclusive. And, it may not take advantage of any or all pre-existing ACEs that have been used in the past, thus missing an important source of institutional knowledge. As a result of these shortcomings, a manually created ACE may not be completely effective, leading to more delay as personnel identify the deficiencies in the ACE and manually refine it or create more ACEs. It would be advantageous to have the ability to promptly, automatically and accurately identify an ACE to use, preferably with a quantitative confidence score. Preferably, such a solution would be compatible with a variety of ACE formats from a wide range of device types and manufacturers.

The teachings of this patent document address and solve the problems identified above, as well as others, and as such have a variety of technical benefits and advantages.

SUMMARY

The methods and systems described herein automatically generate recommendations for network router access control entity (ACE) rules that can be used to filter internet traffic and more specifically to block malicious traffic. In preferred embodiments, the rules are generated by an ACE engine that processes incoming internet packets and examines existing ACEs and a statistical profile of the captured packets to produce one or more recommended ACEs with a quantified measure of confidence. Preferably, the ACE engine recommends an ACE that is parameterized and tuned to the specific attack profile and is available in real time of the attack. Preferably the recommendation is made by automatically selecting from a library of pre-authored ACEs, such as the universe of ACEs that are actively deployed in current ACLs in the system, or that have been deployed the past. The selection can be made by converting the attack traffic profile and each access control entity to model formats, and then using mathematical techniques to determine a similarity score between the attack traffic profile and each access control entity.

Once selected, the ACE(s) then can be deployed automatically or alternatively sent to system personnel for review and confirmation. The recommended ACE may represent an addition or supplement to existing ACEs that are already deployed in a router and/or data cleaning center. In that case, the recommended ACE may be tuned to block attack traffic that was not blocked by the already-deployed ACEs (put another way, to block leak-through attack traffic). Alternatively, there may be no deployed ACEs, so the recommended ACL may be implemented as the initial ACE in the system.

The foregoing summary is intended to provide a non-limiting overview by describing selected aspects of the subject matter described in this document; it is not a recitation of required features nor does it necessarily reflect all embodiments. The scope of the present application is defined solely by the claims.

BRIEF DESCRIPTION OF THE DRAWINGS

The invention will be more fully understood from the following detailed description taken in conjunction with the accompanying drawings, in which.

DETAILED DESCRIPTION

The description herein sets forth embodiments of the invention to provide an overall understanding of the principles of the structure, function, manufacture, and use of the methods and apparatus disclosed herein. The systems, methods and apparatus described in this application and illustrated in the accompanying drawings are non-limiting examples; the claims alone define the scope of protection that is sought. The features described or illustrated in connection with one exemplary embodiment may be combined with the features of other embodiments. Such modifications and variations are intended to be included within the scope of the present invention. All patents, patent application publications, other publications, and references cited anywhere in this document are expressly incorporated herein by reference in their entirety, for all purposes. The term "e.g." used throughout is used as an abbreviation for the non-limiting phrase "for example."

Figure 1:
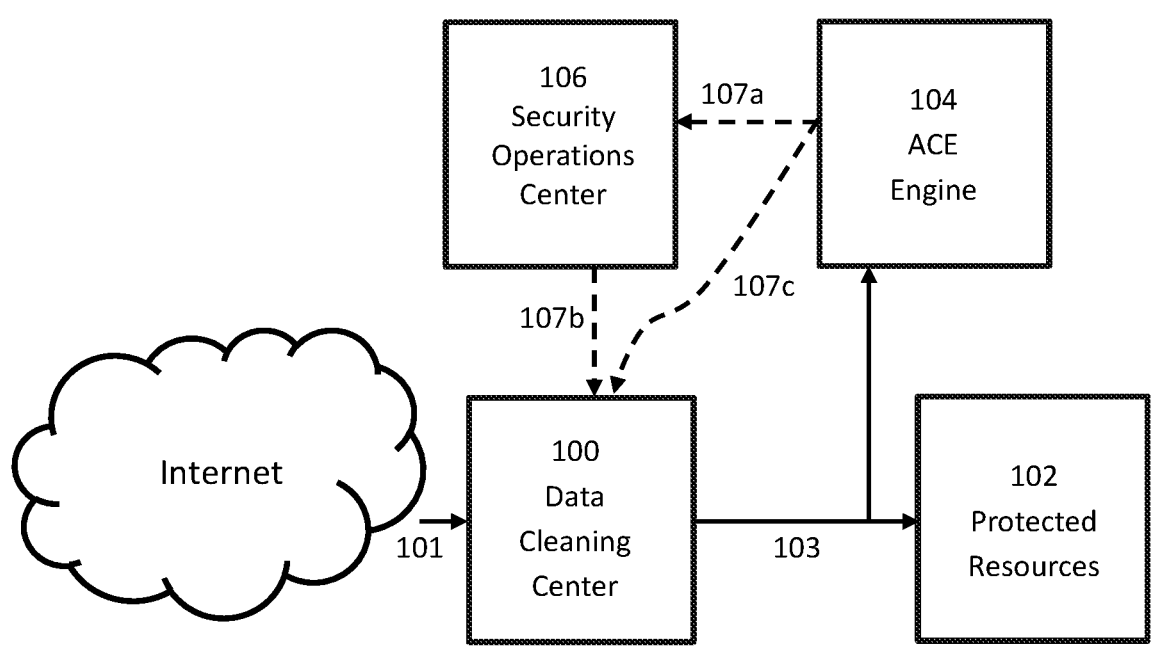
FIG. 1 is a block diagram illustrating an embodiment of a system for automatically generating ACE recommendations and deploying them to filter network traffic.

FIG. 1 is a block diagram illustrating a preferred embodiment of a system for automatically generating ACE recommendations and deploying them to clean network traffic. A data cleaning center 100 has a network connection to the public Internet through which it receives network traffic 101 destined for the protected resources 102. Typically the protected resources 102 include customer servers, such as those hosting public or private websites, web applications, or enterprise resources. The data cleaning center 100 is an infrastructure composed of a variety of hardware and software components designed to examine and clean network traffic. The data cleaning center 100 filters attack traffic from the data stream before passing the clean traffic 103 onwards to its destination 102.

In one embodiment, the data cleaning center 100 may be implemented as described in U.S. Pat. No. 7,478,429, mentioned earlier, and again the teachings of which are hereby incorporated by reference in their entirety. That patent illustrates and describes a data cleaning center with a set of routers (102, 108 in that patent's FIG. 1) and attack mitigation modules (110 in that patent's FIG. 1), each of which may detect and discard attack traffic. Clean traffic is then passed to protected resources such as the second computers (labeled as 80a-d in that patent's FIG. 1).

It should be understood that the teachings hereof are not limited to a particular architecture for the data cleaning center 100. Indeed, in other embodiments, the data cleaning center 100 may be replaced with a single router, firewall, intrusion protection system, or other device, and yet the teachings hereof with respect to the ACE Engine 104 still apply.

ACEs may be installed in the data cleaning center 100 to define the parameters of traffic that should be blocked. (In the context, of U.S. Pat. No. 7,478,429, the ACEs can be installed in the routers and/or in the attack mitigation modules.) Such ACEs may be created by human operators in the security operations centers (SOC) 106 who monitor and operate the data cleaning center 100. The human operators author the ACEs in response to detected attacks. Prospectively authored templates (e.g., designed to block common attacks) could also be used. Further, other ACE creation techniques, such as automated ACE generators, may be used as well to create the library. Automated ACE generators such as Wireshark or those available on the web can be used (http://e<dot>g<dot>, rova<dot>homelinux<dot>net/acl-maker<dot>html, or www<dot>subnet-calculator<dot>com/wildcard<dot>php, or https:// asecuritysite<dot>com/ip/acl or http://bogpeople<dot>com/ cgi-bin/FilterGen<dot>cgi). These automated generators require manual configuration, i.e., a user inputs the IP address and/or other parameters (e.g., protocol, port numbers) and the ACE generator creates one or more ACEs in the proper syntax. The list of ACEs may be generated based on commonly-used ACEs (i.e., corresponding to commonly recognized attributes of "bad" traffic). Any of these automatic generators could be used equally well to supplement or create a ACE library from which the ACE Engine 104 can draw.

In sum, regardless of the source of the ACEs, a library of ACEs may be developed over time, preferably grouped into one or more Access Control Lists (ACLs). Hopefully, if an attack is detected, one or more these ACEs can be deployed to filter out the traffic so that the downstream protected resources 102 are not burdened by high volumes of attack traffic.

As a multi-tenant infrastructure, the data cleaning center 100 can apply a custom set of ACEs for each customer. For example, each customer destination IP address may be associated with a set of ACEs that are active for that IP address. In this document, the traffic destined to a particular customer, or particular destination IP address, or other defined category, is referred to as a "traffic category."

In this embodiment, the ACE Engine 104 taps the traffic 103 that is outbound from the data cleaning center 100. The tap is preferably at the outbound side of the routers/attack mitigation modules, sometimes referred to as the "access" side. Hence the traffic received by the ACE Engine 104 has passed through the active ACEs in the data cleaning center 100—if any—for a given customer. In an alternate embodiment, described later, the ACE Engine 104 can tap the traffic 101 that is inbound to the data cleaning center 100, before it has passed through the ACEs. The location before the ACEs is referred to as a the "border" side of the data cleaning center 100. Hence tapping the traffic 101 is referred to as tapping the "border" side.

The ACE Engine 104 generates ACE recommendations, preferably by selecting one or more ACEs from a pre-existing library of ACEs that are not already active for the customer (or more specifically, for the customer's destination IP address). The ACE Engine 104 can be used in a semi-automated workflow or a fully-automated workflow. In a semi-automated workflow, a security professional in the SOC 106 receives and evaluates the recommended ACE in correspondence with statistics from the traffic profiler and accepts/rejects/edits the recommended ACE before it is deployed. This is shown by arrows 107a-b in FIG. 1. In a fully automated system, the ACE Engine 104 can directly inject a recommended ACE into the router or other data cleaning center equipment, preferably only if the recommend ACE score is above a threshold. This is shown by arrow 107c in FIG. 1.

Figure 2:
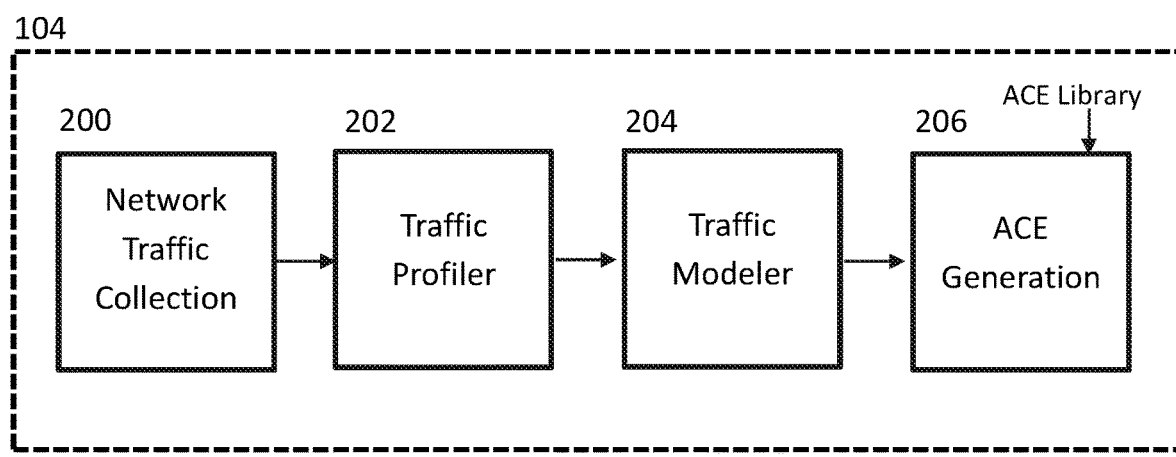
FIG. 2 is a block diagram illustrating processing stages of the ACE Engine 104 shown in FIG. 1, in one embodiment.

FIG. 2 illustrates the processing stages of the ACE Engine 104, in a preferred embodiment. The ACE Engine 104 pipeline consists of a real-time Network Traffic Collection stage 200, a Traffic Profiler Stage 202, a Traffic Modeling stage 204, and an ACE Generation stage 206.

At a high level, the Network Traffic Collection stage 200 collects network traffic from the network tap; the traffic is persisted in a database in computer memory. The Traffic Profiler 204 aggregates packet information and produces a statistical description of properties of the packets. It produces attack traffic profiles for groups of packets that exhibit a particular attack signature, and it sends these attack traffic profiles to the Traffic Modeler 204. The Traffic Modeler 204 transforms the properties of the attack traffic profile into a representation for recommending ACEs. The representation is sometimes referred to herein as a term-model. The ACE Generation component 206 uses machine learning techniques to calculate similarity between models of the pre-existing library ACEs and models of traffic in the attack traffic profile. One or more ACEs with the highest scores of similarity are selected. These recommended ACEs can be sent to the SOC 106 (e.g., to be displayed on a user interface and/or alert) so that personnel can review and approve before installing them in the data cleaning center 100. Alternatively, the ACE Engine 104 can send them directly to the data cleaning center 100 to be automatically installed.

Figure 3:
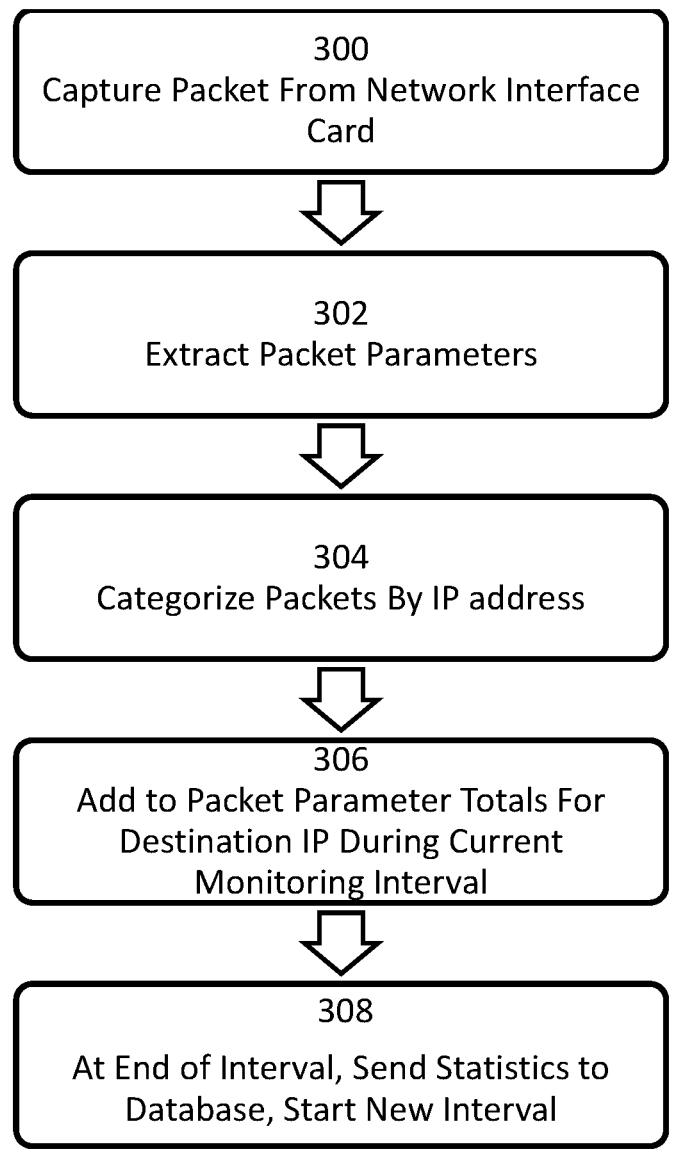
FIG. 3 is a flow chart illustrating steps performed by the Network Traffic Collection component 200, in one embodiment.

FIG. 3 is a flow chart illustrating steps performed by the Network Traffic Collection component 200, in one embodiment.

At step 300, incoming IP packets are captured from the network interface card of the ACE Engine 104.

At step 302, packet parameters are extracted from the packet headers and payload and added to the statistics being tracked for the particular customer host (i.e., in this example, the particular destination IP address). Packet parameters may include the source and destination IP addresses, the transport layer protocol (e.g., TCP, UDP, ICMP, GRE), the source and destination ports, the length of the packet (e.g., size in bytes), the time to live value, fragmentation indicators (e.g., fragmentation flags, fragmentation offset values, fragment identification field), protocol flags (e.g., TCP or UDP flags), TCP window size.

At step 306, the packet is categorized. This means that the system determines which customer host, or preferably destination IP address, that the traffic is addressed to. This is done because, in a preferred embodiment, the Network Traffic Collection component 200 collects statistics grouped by destination IP address. It should be appreciated that statistics could be kept based on another definition of customer endpoint and/or other categories of traffic. For example, a group of destination IP addresses (e.g., /24 or otherwise) could be treated as a single category for the purposes of keeping statistics and detecting attacks.

At step 306, the parameters are added to the totals for the corresponding destination IP address. Preferably, the Network Traffic Collection component 200 aggregates packet statistics over time intervals. For example, the component 200 can maintain statistics on packets received during seconds, one or more minutes, or a some other time period, and send that record to storage. As those skilled in the art will understand, this process occurs continuously to monitor the traffic 101.

At step 308, the statistics for a given IP address and time period are stored in a database. The database thus can be queried by time period and customer to provide data such as: during time period T for Customer C, 30 ICMP packets were received, 900 UDP packets were received, 2000 total packets were received, 100 packets went to destination port 80, and so on.

An example of a statistical record is:
Incoming packet summary
Destination IP Address: 192.0.2.13
Timestamp: Mon May 8 08:33:00 UTC 2017

```
"profile": {
"udpdstport": {
    "47480": "12",
    "21114": "13",
    "51276": "3",
    "47501": "1",
    "8681": "5",
    "59408": "2",
    "50939": "4",
    ...
},
"ipsrc": {
    "192.0.2.112": "79",
    "203.0.113.210": "12",
    "203.0.113.73": "1",
    "192.0.2.35": "3",
    "198.51.100.178": "134",
    "203.0.113.185": "7",
    "192.0.2.184": "26",
    "203.0.113.242": "19",
    "192.0.2.36": "12",
    "198.51.100.86": "44",
    "203.0.113.45": "40",
    "198.51.100.13": "4",
    ....
},
"udplen": {
    "516": "1",
    "1500": "301",
    "1492": "6",
    "1476": "1",
    "1300": "1",
    "1396": "1"
},
"udpsrcport": {
    "123": "1",
    "389": "310"
},
"ipproto": {
    "udp": "311"
},
"iptos": {
    "8": "194",
    "0": "117"
},
"ipflag": {
    "1": "278"
},
"ipfrag_offset": {
    "0": "311"
```

```
        },
        "ipttl": {
            "118": "13",
            "108": "10",
            "111": "7",
            "115": "12",
            "48": "1",
            ....
        }
    },
```

(Note that these and other examples herein contain IPv4 addresses from blocks reserved for documentation, as specified in IETF RFC 5737, not actual assigned IP addresses.)

Figure 4:
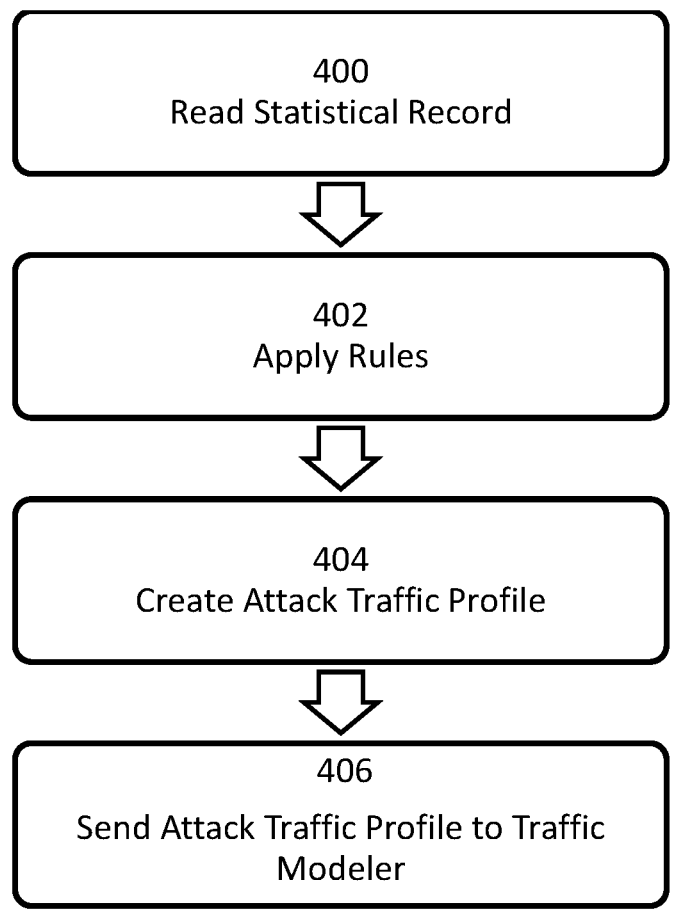
FIG. 4 is a flow chart illustrating the operation of the Traffic Profiler 202 in one embodiment.

FIG. 4 illustrates the operation of the Traffic Profiler 202 in one embodiment. At step 400, the Traffic Profiler reads a statistical record of a given destination IP address and a given time interval from the database. At step 402, the Traffic Profiler applies certain volumetric and statistical rules to look for signs of a potential attack in the traffic. An example is a fragmentation attack: when a significant percentage of the packets received in a time interval are fragmented, it is probably intentionally malicious traffic. The use of particular triggers is not crucial to the teachings hereof for selecting an ACE in light of a detected attack; any attack-detection algorithm, rule or threshold known in the art can be used. In some cases, the Traffic Profiler 202 examines records from across multiple time intervals in order to make a determination of whether an attack is detected.

At step 404, in response to the detection of an attack based on the records, the Traffic Profiler 202 creates an attack traffic profile from the statistical record. In this embodiment, the attack traffic profile essentially labels the record, or pertinent part thereof, with a label identifying it as an attack and with an attack signature. The attack traffic profile contains statistics on the packet parameter statistics that were captured and triggered by detection rules. In some embodiments, the attack traffic profile also includes a signature identifier and a confidence score. The signature identifier indicates the name or kind of the attack that has been detected; the confidence score for the attack signature identifier indicates the level of confidence the system has in that determination, in other words, the confidence score for the attack signature identifier provides the level of confidence that the traffic truly represents an instance of the identified attack. While the ACE Engine 104 uses packet statistics to determine the appropriate ACE, in some cases, the ACE recommendation determination can be augmented referencing the attack signature identifier and/or confidence score of the signature identifier. Further, a human operator can use the attack signature information to confirm the choice of ACE.

An example of an attack signature is shown below:

```
    "signature": {
        "Reflect-LDAP": "310",
        "Reflect-NTP": "1"
    },
```

In sum, the attack traffic profile is the same as the traffic statistical record provided above, but with the addition of the "signature" information from above.

At step 406, the Traffic Profiler 202 sends the attack traffic profile to the Traffic Modeler 204.

Figure 5:
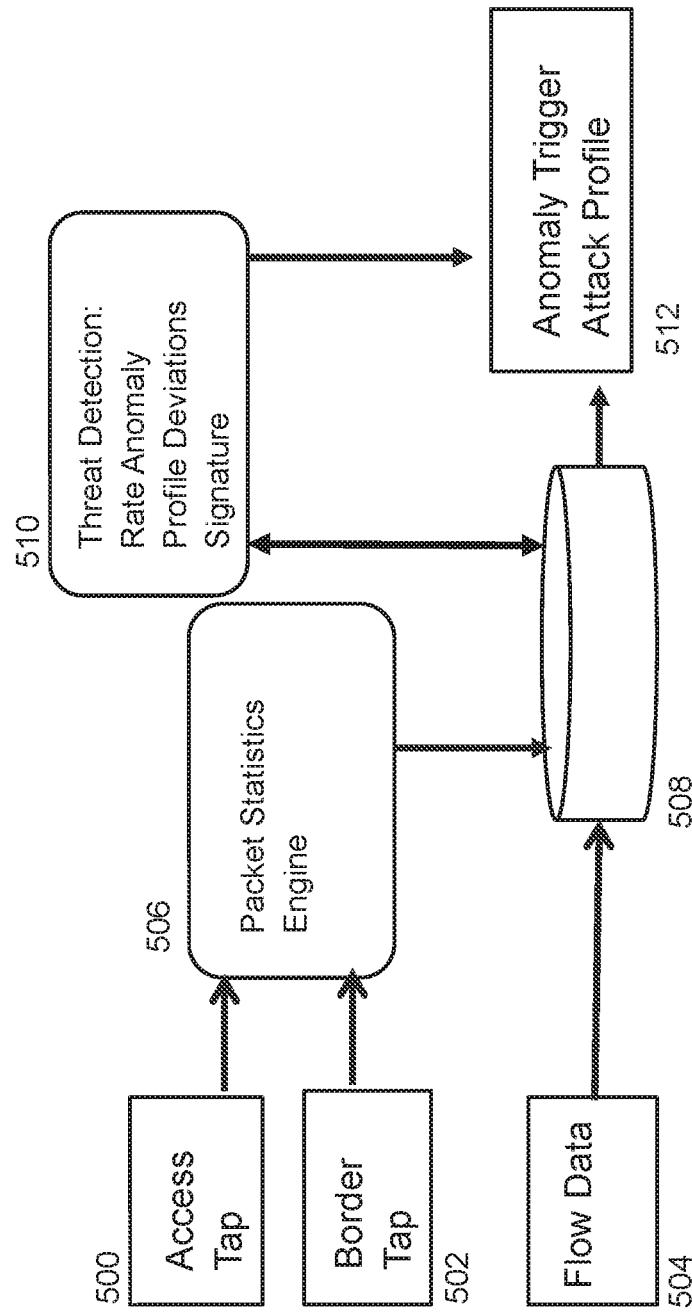
FIG. 5 is a block diagram illustrating in more detail components of the Traffic Profiler 202 shown in FIG. 2.

FIG. 5 is a block diagram illustrating the components of the Traffic Profiler 202 in more detail. FIG. 5 shows that the Traffic Profiler 202 can gather network traffic either from the Access Tap 500 or the Border Tap 502. The operation of the Traffic Profiler 202 has been illustrated and described primarily with respect to the access tap (e.g., see tap from traffic 103 in FIG. 1). But, as mentioned above, the ACE Engine 104 can also intake and analyze border traffic (e.g., tap from traffic 101 in FIG. 1).

Regardless of the tap location, the captured packets are fed to a Packet Statistics Engine 506. The Packet Statistics Engine 506 creates statistics for received packets, preferably grouped by destination IP, over a unit of time, such as seconds or minutes. An example of a statistical record was provided earlier.

A database 508 in computer memory is used to store the packet statistics. A Threat Detection component 510 periodically pulls records from the database 508 and applies one more triggers or rules to detect threats. The rules can be applied using a packet sniffing utility such as Suricata (suricata-ids<dot>org) or Snort for attack signature recognition. This corresponds to steps 400/402 in FIG. 4. An example of a rule is a rate anomaly (amount of traffic abnormally high), profile deviations (traffic not within historical or configured bounds), or signature (look for characteristics of known attacks/exploits). An example of a ruleset (which can be used with Suricata or Snort) is Emerging Threats, Emerging Threats Pro, or Sourcefire VRT (www<dot>emergingthreats<dot>net; www<dot>emergingthreatspro<dot>com; www<dot>snort<dot>org/vrt). The ACE Engine 104 itself is rule-agnostic, that is, any of a wide variety of rules or rulesets being can be used with the ACE Engine 104 and it will make automated ACE recommendations as described herein.

When a rule is triggered, the Anomaly Trigger component 512 is notified. The Anomaly Trigger component 512 creates an attack traffic profile such as the example given earlier. This corresponds to step 404 in FIG. 4. The component 512 sends the attack traffic profile to the Traffic Modeler, per step 406 in FIG. 4.

Figure 6:
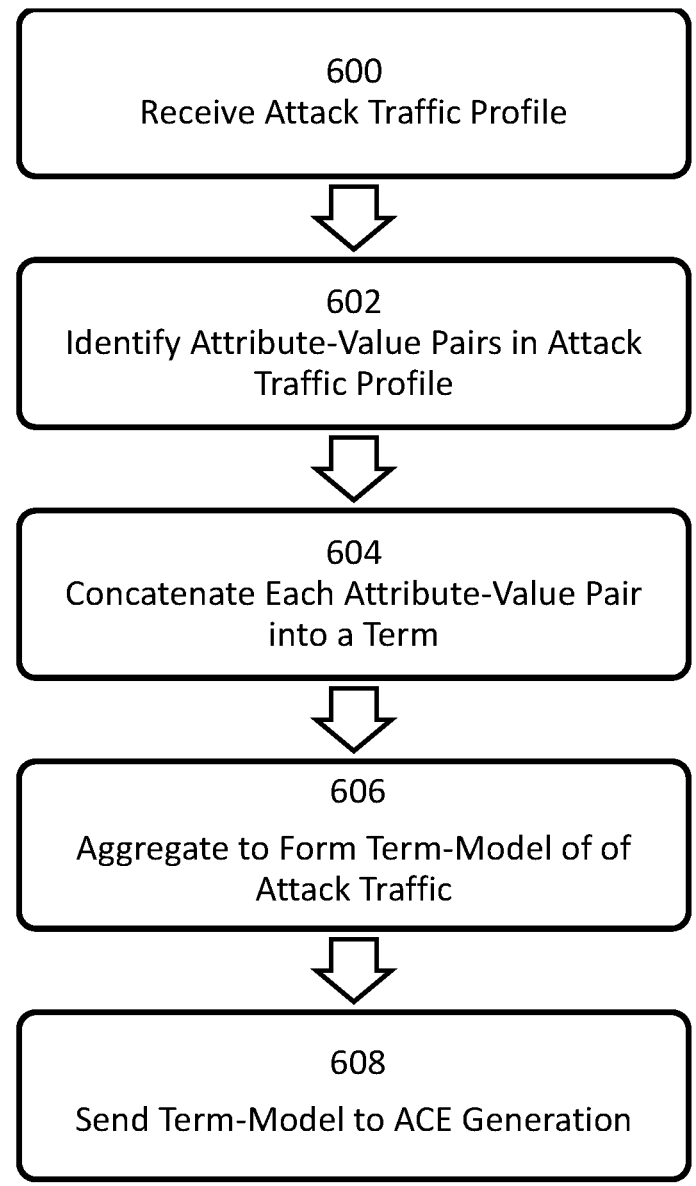
FIG. 6 is a flow chart illustrating the operation of the Traffic Modeler 204 in one embodiment.

FIG. 6 illustrates the operation of the Traffic Modeler 204 in one embodiment. The Traffic Modeler 204 preferably operates on an attack traffic profile to produce a model of the traffic to be blocked.

Preferably, the Traffic Modeler 204 employs modeling techniques inspired by content based filtering concepts, such as those used in document search engines. The attack traffic profile consists of packet statistics. It is analogous to a document, which can have many hundreds of possible values. The ACE has a limited number of values. It is analogous to a query, which has a limited number of words. Document retrieval techniques are useful because they are suited to handle virtually any number of words, making them robust for multi-facet comparisons.

The task of the Traffic Modeler 204 is to prep the traffic data for comparison. This is done by producing a model of the attack traffic based on the attack traffic profile. The model is referred to as "term model." The term model expresses the attack traffic as attributes of objects. These can then be compared to ACEs in a quantifiable, flexible way. The actual comparison process itself—involving the computation of similarity scores—is part of the ACE Generation component 206 and will be described later in this document.

There are many hundreds of statistics. The Traffic Modeler 204 concatenates important attribute names together, with their statistics. Important statistics means those statistics that exist as parameters in the ACE syntax. For example, traffic protocol can be one of {gre, icmp, udp, tcp}. So if the Traffic Modeler 204 sees UDP information in the attack traffic profile, it creates "protocol-udp". If there is a GRE protocol packet, the entry would be "protocol-gre". The numeric value shows the percentage of packets, over the time interval, with that attribute. (This is analogous to a document with many thousands of words in it.)

Returning to FIG. 6, in one embodiment, the Traffic Modeler 204 processing involves (step 600) receiving an attack traffic profile (600) from the Traffic Profiler 202, parse the attack traffic profile to identify each attribute-value pair (602), concatenate each such pair to create a corresponding term (604). The terms are aggregated to form a term-model (606). The resulting term-model of the attack traffic is sent the ACL Generation stage 206 (606).

Below is an example output from step 606, i.e., an attack traffic profile in term-modeled format:

"destination IP","name","value"
192.0.2.13, "packet-count",39636.0
192.0.2.13, "tcpsrcport-80",0.5801825293350718
192.0.2.13, "udpdstport-443",0.33376792698826596
192.0.2.13, "protocol-udp",0.6192959582790091
192.0.2.13, "protocol-tcp",0.33376792698826596
192.0.2.13, "action-deny",1.0
192.0.2.13, "udpsrcport-389",0.9967845659163987

This attack traffic profile relates to traffic directed to a particular IP address, which could be associated with a particular customer (tenant) in a multi-tenant platform. The traffic attributes are shown in quotes after the destination IP; the values of the attributes are shown following the attribute. The values can be amounts (e.g., for packet-count), true/false flags (e.g., for action-deny) or percentages (e.g., for tcpsrcport-80). Note that the attack signature identifier is not part of the attribute list, but the signature identifier can, if desired, be carried within the term-model in a separate data field for later use in ACE generation. Hence, an example of an attribute is "packet-count", the value is 39636.0, this attribute-value pair together is a term. It represents one term of seven shown above in the term-model. Another example is the attribute of "protocol-udp", with the value of 0.619 ..., meaning that about 62 percent of the packets were UDP packets.

Figure 7:
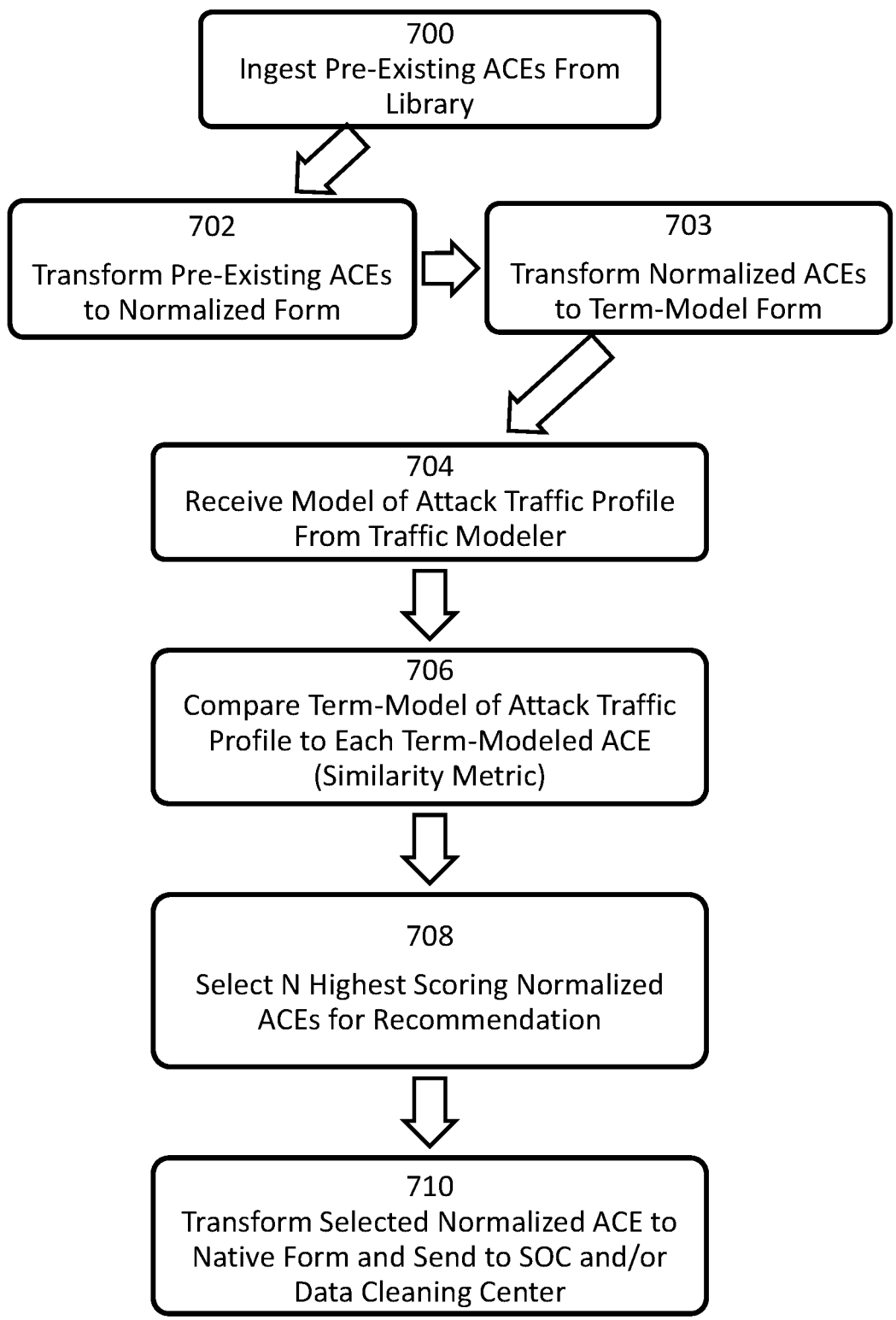
FIG. 7 is a flow chart illustrating an embodiment of the operation of the ACL Generation 206 component.

FIG. 7 illustrates an embodiment of the operation of the ACE Generation 206 component. At steps 700/702, the ACE Generation component 206 ingests (700) pre-existing ACEs and transforms (702) them into a form that can be compared to the attack traffic profile. This means that ACEs written by SOC 106 personnel, or previously created by another system, can be ingested into the component (see "ACE Library" on FIG. 2). The ACE Library preferably contains all pre-existing ACEs available in the system, regardless of which ACL they are on. However, if desired, the ingested ACEs can be limited to those from selected ACLs (or certain ACLs can be excluded) from consideration as part of the ACE Library.

The ingested ACEs can be transformed from their native form to a normalized form. A native form refers to a syntax of an ACE that is specific to a particular make/model of router or other device. A normalized form of an ACE is a syntax used by the ACE Generation component 206 to represent the ACE in a consistent fashion. Preferably the normalized form is router/device-agnostic and preferably it abstracts the host IP address, as that represents the IP address of the machine for which the ACE was originally created, but not necessarily the host IP address of the machine that the ACE is being evaluated for use with. The normalized ACE can then be expressed in a term-modeled form so as to be able to mathematically compare ACEs to a term-modeled attack traffic profile regardless of the form in which the ACE originally was authored. In this way, the ACE Engine 104 can evaluate and select optimal ACEs in a device-agnostic way. It can then transform the output into a native form appropriate for the target router or other device.

It should be understood that the ingestion of ACEs can be done at any time; it is not necessarily limited to being done at the time of traffic monitoring.

An example of a set of Cisco router ACEs (i.e., a Cisco ACL) is shown below:

Sample of Cisco Router ACL for customer.
ipv4 access-list protect
   deny udp any host 192.0.2.13 eq 120
   deny udp any host 192.0.2.13 fragments
   deny udp any 192.0.2.0/24 eq 80
   deny udp any eq ntp host 192.0.2.13 eq 80
   deny udp any eq domain host 192.0.2.13

An example of the Cisco router ACEs above written in a normalized form is show below:

Sample of normalized ACEs in ACE Library
{"aclId":61,"action":"deny","protocol":"udp","source-Host":"any","sourcePort":"any","de stHost":"host", "destPort":"120"}
{"aclId":56,"action":"deny","protocol":"udp","source-Host":"any","sourcePort":"any","de stHost": "host", "destPort": "any","fragments": "fragments" }
{"aclId":60,"action":"deny","protocol":"udp","source-Host":"any","sourcePort":"any","de stHost":"host", "destPort":"80"}
{"aclId":62,"action":"deny","protocol":"udp","source-Host":"any","sourcePort":"123","de stHost":"host", "destPort":"80"}
{"aclId":64,"action":"deny","protocol":"udp","source-Host":"any","sourcePort":"53","dest Host": "host", "destPort": "any" }

Observe that as part of normalization in this instance, source and destination IP addresses have been removed from the ACEs. Port numbers still appear because port information is often an important parameter in an ACE, given that port number is indicative of the type of service that a server is providing and that needs to be protected. In some cases, the source IP address could be retained, if deemed to be significant (e.g., a known botnet).

At step 703 of FIG. 7, the normalized ACEs in the ACE library are transformed into term-model form. Like the term-model for the attack traffic profiles, the ACE term-model expresses a given ACE in an attribute-value form. The term-modeled ACE carries a value of 1.0, as a Boolean, if it exists.

Below are examples of two of the normalized ACEs above, in term-modeled ACE format:

61,"action-deny",1.0
61,"protocol-udp",1.0
61,"srchost-any",1.0
61,"udpsrcport-any",1.0
61,"dsthost-host",1.0
61,"udpdstport-120", 1.0
56,"action-deny",1.0
56,"protocol-udp",1.0
56,"srchost-any",1.0
56,"udpsrcport-any",1.0
56,"dsthost-host",1.0
56,"udpdstport-any",1.0
56,"fragments",1.0

For example, in ACE 61 the attribute "protocol-udp" is accompanied by the value 1.0, meaning it exists in the above ACE.

At step 704, the ACE Generation component 206 receives a model of the attack traffic profile from the Traffic Modeler 204. At 706, the ACE Generation component 206 iteratively compares the model against each of the ACEs in the library (or to a designated subset thereof, if desired), using their term-modeled form. Preferably, the comparison is performed by using a similarity model to produce a similarity measure between the model of the attack traffic profile and each ACE in modeled form.

In a preferred embodiment, the similarity is calculated between a term-model for an attack traffic profile and a term-model for an ACE, each expressed as vectors. The measure is the cosine similarity between the two vectors taking the common facets of the vectors into account. A facet in this context corresponds to a packet parameter.

Other similarity models known in the art, particularly but without limitation those inspired by document retrieval like cosine similarity, might be used alternatively, and the teachings hereof are not restricted to a particular similarity model.

In some embodiments, a weighting function can be applied to certain packet parameters, such as described above.

At step 708, the ACE Generation component 206 ranks the ACEs to find the one(s) with the highest similarity score. Generalizing, a set of N ACEs with the highest similarity scores (lowest distance apart measures) are identified.

At step 710, the ACE Generation component 206 can transform the selected ACE(s) from the modeled form to normalized form and/or a target native form, e.g., Cisco router ACE syntax. Alternatively, the modeled form could be sent for review and this transformation done later by another process (e.g., in the data cleaning center).

For example, assume a term-modeled attack profile, as shown below, for a given IP address 192.0.2.13. This server is undergoing an anomalous LDAP Reflection attack.

"destinationIp","name","value"
192.0.2.13,"packet-count",3110.0
192.0.2.13,"udpsrcport-389", 0.99678456659163987
192.0.2.13,"protocol-udp",1.0
192.0.2.13,"action-deny",1.0

During the traffic modeling, there are thousands of possible combinations in the traffic, but preferably only the essential properties are forwarded on to ACE Generation.

The ACE Engine 104 can select a recommended ACE to protect host 192.0.2.13 as shown below:

---

Traffic Model, Server 192.0.2.13
Recommended ACE, Confidence: 3.2468,
{"action":"deny","protocol":"udp","sourceHost":"any","sourcePort":"389","destHost":"192.0.2.13","destPort": "any"}
Recommended ACE in Cisco syntax: "deny udp eq 389 host 192.0.2.13"
Score 3.24600

---

Also at 710, the selected ACE(s) (after conversion to the desired form) are sent to a user interface in the SOC 106 for evaluation/deployment. Alternatively, they can be sent directly to the data cleaning center and automatically installed in routers or attack mitigation modules in the data cleaning center 100. This latter case is preferably used only if the recommended ACE score is above a threshold value. This was already described above with respect to FIG. 1. Once the ACEs are deployed in the data cleaning center 100, they are referred to as the "logged" ACEs.

Figure 8:
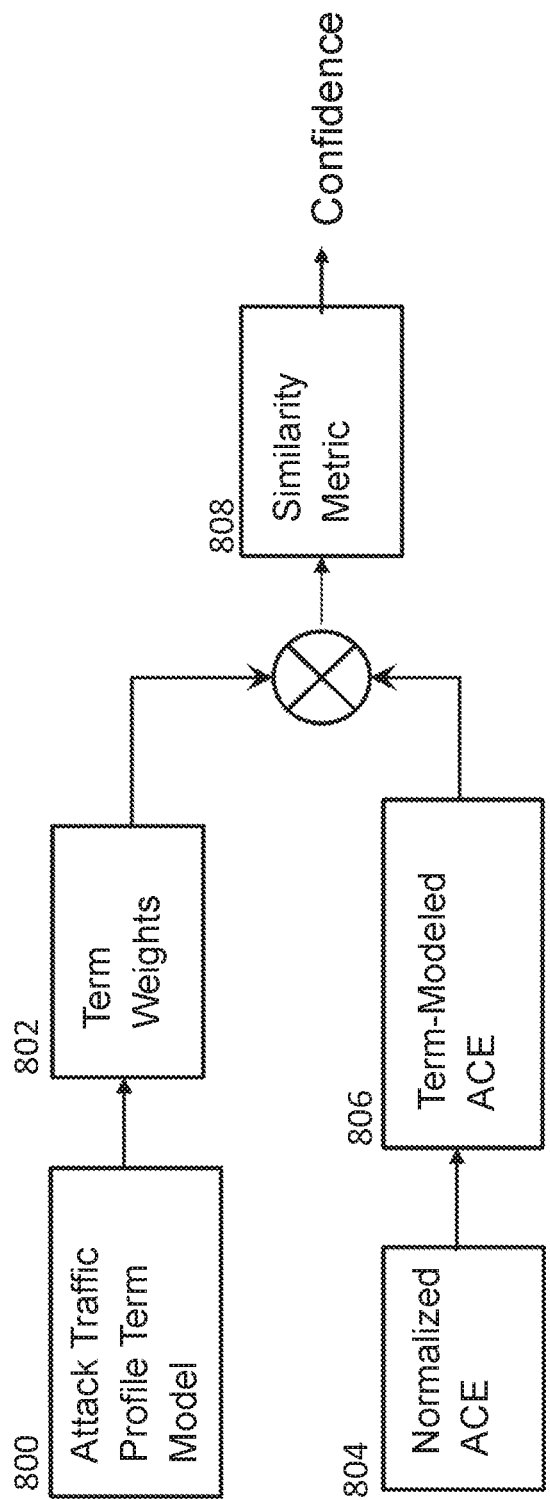
FIG. 8 is a diagram illustrating the operation of the ACE component 206, in one embodiment; and, FIG. 9 is a block diagram illustrating hardware in a computer system that may be used to implement the teachings hereof.

FIG. 8 is another diagram illustrating the operation of aspects of the Traffic Modeler 294 and ACE Generation 206. In particular, FIG. 8 focuses on the term-modeling and similarity comparison operations. FIG. 8 provides a data-flow perspective on that operation, in supplement to the process-oriented descriptions given above with regard to FIGS. 6-7.

Blocks 800 and 802 show the receipt of the attack traffic profile in term-modeled form and the assignment of weights to selected attributes. As mentioned above, an example is to weight port number more highly than other attributes.

Blocks 804 and 806 show the receipt of a normalized ACE and the conversion to a term-modeled ACE.

Block 808 illustrates the calculation of the similarity metric between the two term-models. The similarity metric is converted to a confidence measure. The process is repeated for other library ACEs, and the resulting confidence scores are compared to find the top-scoring ACE, or in some embodiments the top N scoring ACEs.

A detailed example of the calculation of the similarity metric is now provided, in three parts A, B, C.

Part A (Attack Traffic Profile): As explained earlier, after an attack is detected, an attack traffic profile is produced and this attack traffic profile is converted to a term-model. Below is an example attack traffic term-model for a NTP reflection attack. It is UDP protocol and has 94% of its packets coming from source IPs with port 123.

Attack Traffic Term-Model Example A
"destIp","name","value"
ip1,"packet-count",60858.0
ip1,"udpsrcport-123",0.9434749745308751
ip1,"protocol-udp",0.946432679351934
ip1,"action-deny",1.0
ip1,"signature-Reflect-NTP",0.9434749745308751

Part B (ACE): As explained earlier, after normalizing all the available ACEs into the ACE Library, the system converts the ACE Library into term-model forms. Below is an example list of two ACEs in the term-model form. Notice that the numeric value is always "1.0" because it is a boolean, i.e., the parameter exists. There are typically hundreds of normalized ACEs in a given library.

ACE1,"action-deny",1.0
ACE1,"protocol-udp",1.0
ACE1,"srchost-any",1.0
ACE1,"udpsrcport-123",1.0
ACE1,"dsthost-host",1.0
ACE1,"udpdstport-any",1.0
ACE2,"action-deny",1.0
ACE2,"protocol-icmp",1.0
ACE2,"srchost-any",1.0
ACE2,"icmpsrcport-any",1.0
ACE2,"dsthost-host",1.0
ACE2,"icmpdstport-any",1.0
ACE2,"args-echo-reply",1.0

Part C (Comparing Term-Modeled Attack Traffic Profile to Term-Modeled ACE). For a given attack traffic profile for a given destination IP address, ip1, the system loops thru the whole list of term-modeled ACEs. It takes the fields that the term-modeled attack traffic profile and the term modeled ACE have in common and includes them in the similarity calculation. Consider the Attack Traffic Term Model Example A, above. Its entry reading:

ip1,"protocol-udp",0.946432679351934 would match against

ACE1,"protocol-udp",1.0

Thus ACE1 would gain points (in accord with a cosine similarity operation) relative to Attack Traffic Term Model A. ACE2 would not have a protocol match. The algorithm would then move to the next term-model entry in Attack Traffic Term Model A until all have been compared. Preferably, the ACE only gains points for matches or gains no points for misses. Then the ACEs scores are evaluated.

Another example is the entry reading:

ip1,"udpsrcport-123",0.9434749745308751 would match against

ACE1,"udpsrcport-123",1.0

Thus ACE1 would gain points from this comparison. The more fields that an ACE has in common and with a high percentage, the higher the similarity, hence confidence.

Preferably, weighting is applied to the port numbers because they are oftentimes very important. The points from a match on an exact port match are not weighted because it already matches (and thus contributes to the score). However, an ACE has a port attribute of "any", while it does not match exactly on a particular port number, is preferably still treated as a port match to a specific port, but with a lower value. For example, an "any" port match is valued at 0.25 of an exact port match, so that it can play a role, albeit reduced. The amount of the weighting will vary depending on the number of attributes in the typical ACE (the example of 0.25 is for about 4-6 attributes). Of course, the particular weightings will vary with the environment and particular application. Further, other attributes can be weighted as well.

Operational Examples of ACE Engine

Presented below are several examples of the operation of the ACE Engine 104. In general, there are two use cases shown below. One involves the situation where no ACEs are installed for a given category of traffic (e.g., traffic associated with a particular customer and/or destination IP address). The ACE Engine 104 produces one or more recommended ACEs to deploy in the first instance. The second use case involves the situation where one or more ACEs have already been deployed in the data cleaning center 100. If attack traffic is detected in the outbound traffic 103, this means that it has "leaked" through the ACEs. In this situation, the ACE Engine 104 produces one or more recommended ACE(s) to add to the set of ACEs that are already deployed for the given category of traffic.

Note that in both of the above situations, the traffic 103 being evaluated for threats is on the "access" side of the data cleaning center 100. That is, it is the outbound traffic, post-scrubbing. As mentioned, it is also possible to use the ACE Engine 104 techniques on the inbound side. That is, tap the traffic 101 on FIG. 1, and make recommendations for ACEs pre-scrubbing.

Legend for Examples 1-3: "Recommended ACEs" shows the top modeled ACE with its confidence measure. The recommendation is preferably in a range of about 3.00 or above. "Current ACEs" shows any ACEs that are already installed for a customer. "Logged ACE" shows what SOC 106 personnel submitted and when they submitted it. The logged ACE is in Cisco Router syntax.

Example 1

---

Description of destination ip 192.0.2.13 {udpsrcport-53=0.3673469387755102, fragments=0.6326530612244898, protocol-udp=1.0, action-deny=1.0, signature-Fragment=0.6326530612244898, signature-Reflect-DNS=0.42857142857142855}:
Recommendations ACCESS: 2017-04-15 05:15:00: 192.0.2.13
    1:3.1327,
    {"aclId":1,"action":"deny","protocol":"udp","sourceHost":"any","sourcePort":"any","dest Host":"192.0.2.13","destPort":"any","fragments":"fragments"}
Current ACEs for ACCESS: 2017-04-15 05:15:00: 192.0.2.13
    None
Logged ACE
    "fpd":"2017-04-15T05:16:59.000Z"}    4 CmdSet=[ CmdAV=ipv4 access-list border-protect 2 deny udp any host 192.0.2.13 fragments <cr> ]
Description:
    This particular customer does not have any ACLS at the time of this attack. The recommendation with highest confidence (3.13) written in Cisco jargon is "deny udp any host 192.0.2.13 fragments"
SOC put an ACE in
    "deny udp any host 192.0.2.13 fragments"

---

Example 2

---

Description of destination ip 192.0.2.10 {udpsrcport-123=0.9984326018808778, protocol-udp=0.9984326018808778, udpdstport-2146=0.493730407523511, action-deny=1.0, signature-Reflect-NTP=0.9984326018808778}:
Recommendations ACCESS: 2017-04-16 00:19:00: 192.0.2.10
    15: 3.2469,
    {"aclId":15,"action":"deny","protocol":"udp","sourceHost":"any","sourcePort":"123","destHost":"192.0.2.10","destPort":"any"}
Current ACEs for ACCESS: 2017-04-16 00:19:00: 192.0.2.10
    None
Logged ACE
    "fpd":"2017-04-16T00:20:33.000Z"}    3 CmdSet=[ CmdAV=ipv4 access-list border-protect 1 deny udp any eq 123 host 192.0.2.10 neq 123 <cr> ]

-continued

Description:
This particular customer does not have any ACEs at the time of this attack. The recommendation in Cisco jargon is "deny udp any eq 123 host 192.0.2.10"
SOC put an ACE in
"deny udp any eq 123 host 192.0.2.10 neq 123"

Tapping Traffic on Border Side

The examples above were based on the tapping traffic from the access side of the data cleaning center. In this was the recommended ACEs can be chosen to block "leak-through" attack traffic. As already stated and reiterated here, however, any and all of the teachings hereof can be applied just as well to traffic tapped from the border side of a data cleaning center. The border side means that the traffic is tapped before being filtered with ACEs in the data cleaning center. Using the methods described above and illustrated in FIGS. 1-8, the ACE Engine 104 can recommend an ACE for installation in the data cleaning center when no other ACEs have been installed. If ACEs have been installed, then such ACEs can be marked as "excluded" so that the ACE Engine 104 looks for the highest scoring ACE other than the excluded ACE(s).

Potential Benefits and Advantages

The following highlights features and benefits that may be achieved with the teachings hereof, in certain embodiments. It is not meant to suggest certain features or benefits that must be achieved or must be performed in order to practice the teachings hereof.

One novel aspect of the example system described above is its ability to learn and adapt to the existing ACEs. ACEs can be written as very simple or with more complexity. ACEs have internet addresses and ports, but they may include parameters such as length, time-to-live, fragmentation, and specific TCP flags combinations. Different organizations have different policies on how to configure ACEs. If an ACE is desired with more complex parameters, the ACE Engine 104 will incorporate that in its model foundation.

Another novel aspect is that the recommended ACE is explainable—the output of the Traffic Modeler 204 provides the basis of the decision. The basis of the decision is apparent from the score of the selected ACE; and moreover, from the particular parameters of the ACE that were similar to the attack traffic profile. If security personnel wish, they can view the incoming traffic using existing profile tools such as Wireshark or Moloch to confirm the traffic.

Computer Based Implementation

The teachings hereof may be implemented with conventional computer systems, but as modified by the teachings hereof, with the functional characteristics described above realized in special-purpose hardware, general-purpose hardware configured by software stored therein for special purposes, or a combination thereof.

Software may include one or several discrete programs. Any given function may comprise part of any given module, process, execution thread, or other such programming construct. Generalizing, each function described above may be implemented as computer code, namely, as a set of computer instructions, executable in one or more microprocessors to provide a special purpose machine. The code may be executed using an apparatus—such as a microprocessor in a computer, digital data processing device, or other computing apparatus—as modified by the teachings hereof. In one embodiment, such software may be implemented in a programming language that runs in conjunction with a proxy on a standard Intel hardware platform running an operating system such as Linux. The functionality may be built into the proxy code, or it may be executed as an adjunct to that code, such as the "interpreter" referenced above.

While in some cases above a particular order of operations performed by certain embodiments is set forth, it should be understood that such order is exemplary and that they may be performed in a different order, combined, or the like. Moreover, some of the functions may be combined or shared in given instructions, program sequences, code portions, and the like. References in the specification to a given embodiment indicate that the embodiment described may include a particular feature, structure, or characteristic, but every embodiment may not necessarily include the particular feature, structure, or characteristic.

Figure 9:
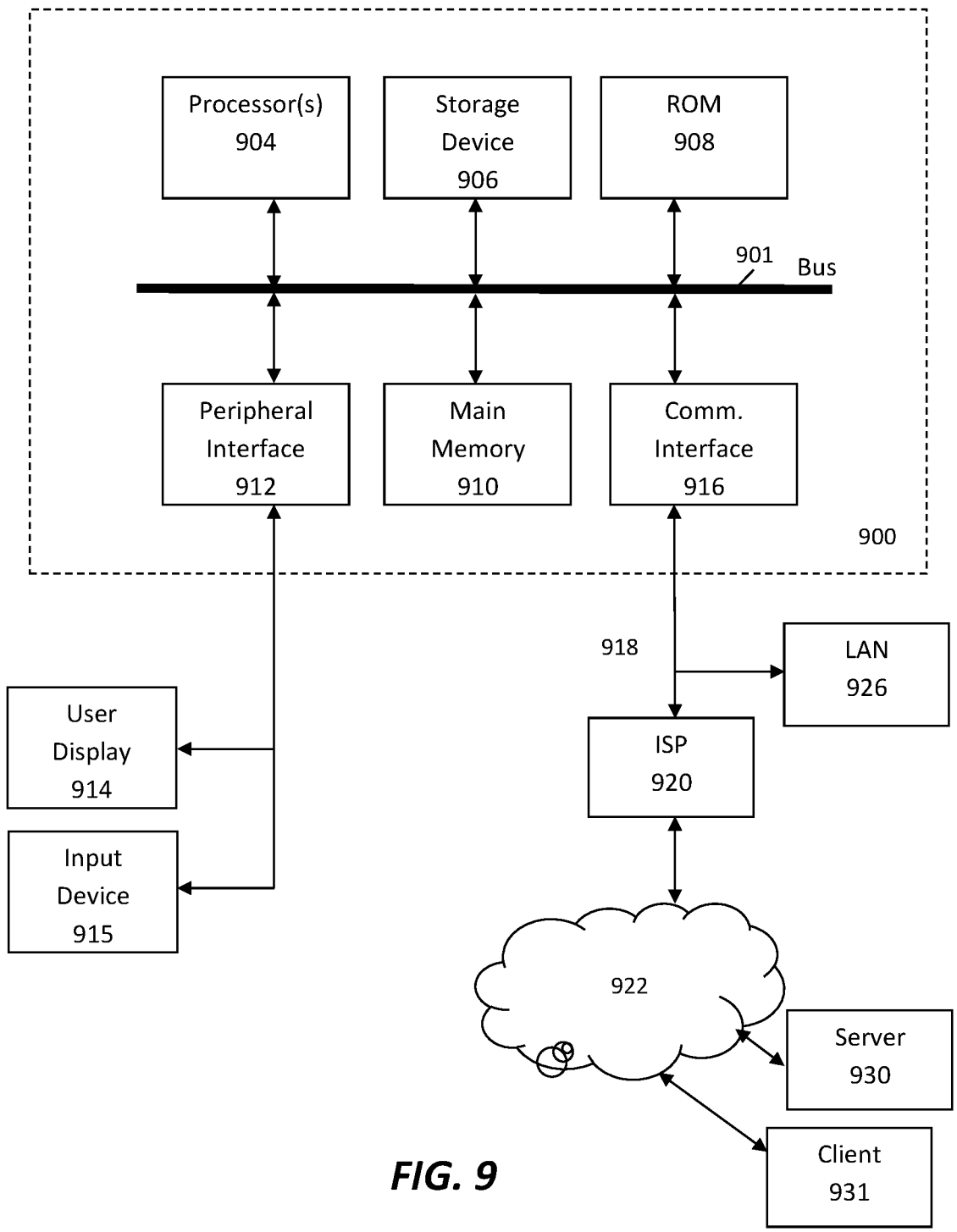

FIG. 9 is a block diagram that illustrates hardware in a computer system 900 upon which such software may run in order to implement embodiments of the invention. The computer system 900 may be embodied in a client device, server, personal computer, workstation, tablet computer, mobile or wireless device such as a smartphone, network device, router, hub, gateway, or other device. Representative machines on which the subject matter herein is provided may be Intel Pentium-based computers running a Linux or Linux-variant operating system and one or more applications to carry out the described functionality.

Computer system 900 includes a microprocessor 904 coupled to bus 901. In some systems, multiple processor and/or processor cores may be employed. Computer system 900 further includes a main memory 910, such as a random access memory (RAM) or other storage device, coupled to the bus 901 for storing information and instructions to be executed by processor 904. A read only memory (ROM) 908 is coupled to the bus 901 for storing information and instructions for processor 904. A non-volatile storage device 906, such as a magnetic disk, solid state memory (e.g., flash memory), or optical disk, is provided and coupled to bus 901 for storing information and instructions. Other application-specific integrated circuits (ASICs), field programmable gate arrays (FPGAs) or circuitry may be included in the computer system 900 to perform functions described herein.

A peripheral interface 912 communicatively couples computer system 900 to a user display 914 that displays the output of software executing on the computer system, and an input device 915 (e.g., a keyboard, mouse, trackpad, touchscreen) that communicates user input and instructions to the computer system 900. The peripheral interface 912 may include interface circuitry, control and/or level-shifting logic for local buses such as RS-485, Universal Serial Bus (USB), IEEE 1394, or other communication links.

Computer system 900 is coupled to a communication interface 917 that provides a link (e.g., at a physical layer, data link layer, or otherwise) between the system bus 901 and an external communication link. The communication interface 916 provides a network link 918. The communication interface 916 may represent a Ethernet or other network interface card (NIC), a wireless interface, modem, an optical interface, or other kind of input/output interface.

Network link 918 provides data communication through one or more networks to other devices. Such devices include other computer systems that are part of a local area network (LAN) 926. Furthermore, the network link 918 provides a link, via an internet service provider (ISP) 920, to the Internet 922. In turn, the Internet 922 may provide a link to other computing systems such as a remote server 930 and/or a remote client 931. Network link 918 and such networks may transmit data using packet-switched, circuit-switched, or other data-transmission approaches.

In operation, the computer system 900 may implement the functionality described herein as a result of the processor executing code. Such code may be read from or stored on a non-transitory computer-readable medium, such as memory 910, ROM 908, or storage device 906. Other forms of non-transitory computer-readable media include disks, tapes, magnetic media, CD-ROMs, optical media, RAM, PROM, EPROM, and EEPROM. Any other non-transitory computer-readable medium may be employed. Executing code may also be read from network link 918 (e.g., following storage in an interface buffer, local memory, or other circuitry).

It should be understood that the foregoing has presented certain embodiments of the invention that should not be construed as limiting. For example, certain language, syntax, and instructions have been presented above for illustrative purposes, and they should not be construed as limiting. It is contemplated that those skilled in the art will recognize other possible implementations in view of this disclosure and in accordance with its scope and spirit. The appended claims define the subject matter for which protection is sought.

It is noted that trademarks appearing herein are the property of their respective owners and used for identification and descriptive purposes only, given the nature of the subject matter at issue, and not to imply endorsement or affiliation in any way.

The invention claimed is:

1. A method performed by one or more computers for automatically selecting at least one access control entity to block network packets associated with a newly detected computer network attack, the method comprising:
    extracting packet parameters from each of a plurality of network packets that are captured from at least one network interface card in a data cleaning center;
    generating a set of attribute-value pairs summarizing the packet parameters of the plurality of network packets;
    ingesting a plurality of pre-existing access control entities, each pre-existing access control entity having been previously authored to block traffic associated with a previously detected computer network attack, each pre-existing access control entity having been authored in a syntax specific to at least one of a make and a model of a network protection device in the data cleaning center, and each pre-existing access control entity being suitable for installation in the network protection device to block network packets meeting criteria specified by the pre-existing access control entity;
    transforming each of the plurality of pre-existing access control entities into a format that expresses the plurality of pre-existing access control entities using a set of one or more names;
    transforming the set of attribute-value pairs into the format, so as to express the set of attribute-value pairs using names from the set of one or more names;
    comparing each of the plurality of transformed pre-existing access control entities to the transformed set of attribute-value pairs; and,
    based on the comparison, recommending at least one of the plurality of pre-existing access control entities for blocking the plurality of network packets.

2. The method of claim 1, wherein the recommending is based at least in part on a mathematical similarity between the at least one of the plurality of transformed pre-existing access control entities and the transformed set of attribute-value pairs.

3. The method of claim 1, wherein the recommending comprises producing a confidence score.

4. The method of claim 1, wherein the recommending comprises displaying the recommended at least one pre-existing access control entity on a user interface in a security operations center associated with the data cleaning center.

5. The method of claim 1, wherein after review by a person in a security operations center associated with the data cleaning center, the method further comprises:
    transmitting at least one of:
        (i) the recommended at least one pre-existing access control entity, and
        (ii) the recommended at least one pre-existing access control entity after edits by the person, to the network protection device, for installation therein to block further network packets.

6. The method of claim 1, the method further comprising:
    transmitting the recommended at least one pre-existing access control entity to the network protection device, for installation therein to block further network packets.

7. The method of claim 1, wherein the network protection device comprises at least one of: a router, a firewall, and intrusion protection device.

8. A system comprising one or more computers having circuitry forming one or more processors and memory storing computer program instructions for execution on the one or more processors, the memory storing computer program instructions that, when executed, operate the one or more computers to:
    extract packet parameters from each of a plurality of network packets that are captured from at least one network interface card in a data cleaning center;
    generate a set of attribute-value pairs summarizing the packet parameters of the plurality of network packets;
    ingest a plurality of pre-existing access control entities, each pre-existing access control entity having been previously authored to block traffic associated with a previously detected computer network attack, each pre-existing access control entity having been authored in a syntax specific to at least one of a make and a model of a network protection device in the data cleaning center, and each pre-existing access control entity being suitable for installation in the network protection device to block network packets meeting criteria specified by the pre-existing access control entity;
    transform each of the plurality of pre-existing access control entities into a format that expresses the plurality of pre-existing access control entities using a set of one or more names;

transform the set of attribute-value pairs into the format, so as to express the set of attribute-value pairs using names from the set of one or more names;

compare each of the plurality of transformed pre-existing access control entities to the transformed set of attribute-value pairs; and, based on the comparison, recommend at least one of the plurality of pre-existing access control entities for blocking the plurality of network packets.

* * * * *